Sept. 8, 1942.                E. H. MUELLER                2,295,002
                          LIGHTER FOR GAS BURNERS
                    Filed May 20, 1940            2 Sheets-Sheet 1

INVENTOR.
Ervin H. Mueller
BY
Barnes, Kisselle, Laughlin & Raisch
ATTORNEYS

Sept. 8, 1942.  E. H. MUELLER  2,295,002
LIGHTER FOR GAS BURNERS
Filed May 20, 1940  2 Sheets-Sheet 2
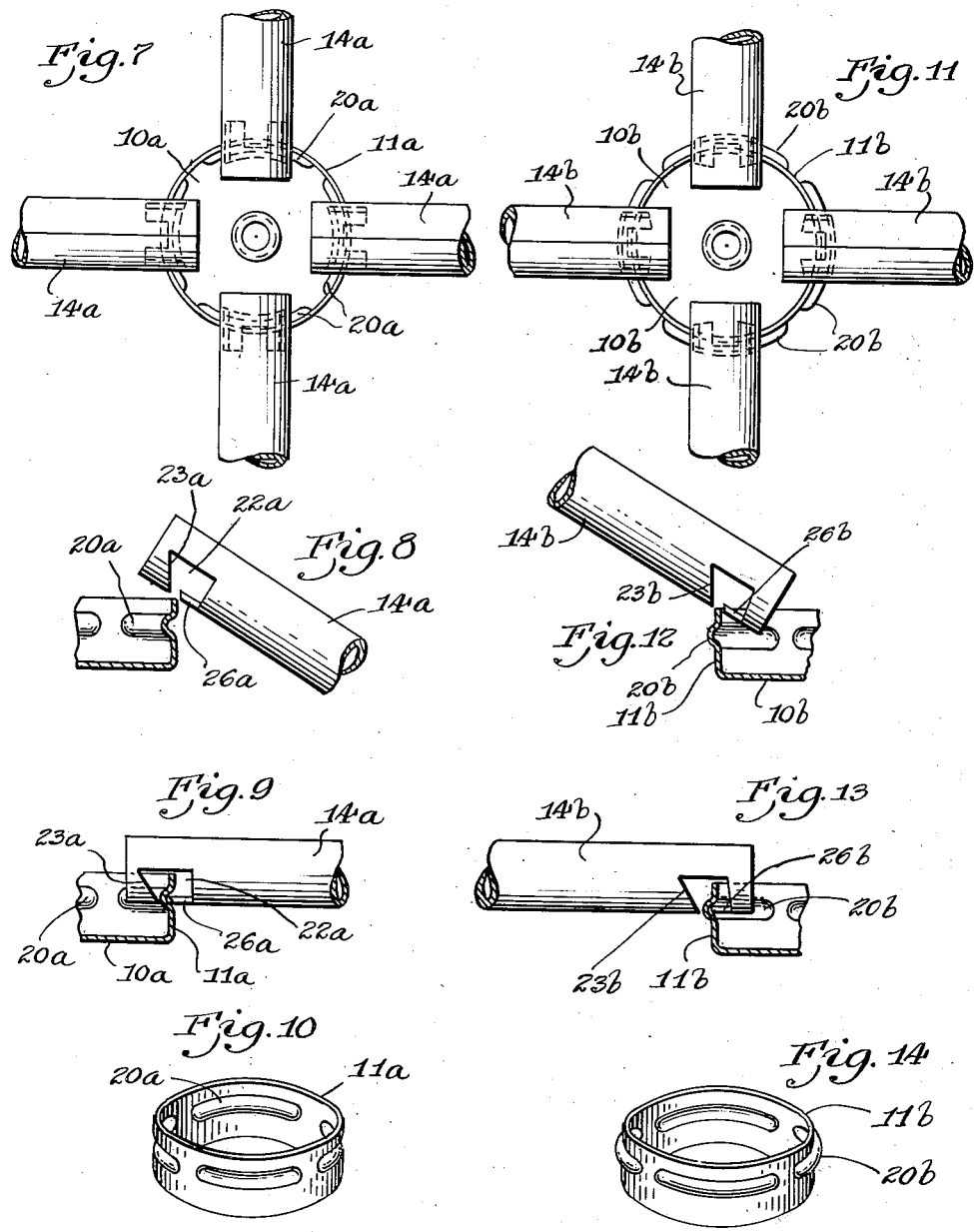
INVENTOR.
Ervin H. Mueller
BY
Barnes, Kisselle, Laughlin & Raisch
ATTORNEYS Patented Sept. 8, 1942

2,295,002

UNITED STATES PATENT OFFICE 2,295,002

LIGHTER FOR GAS BURNERS

Ervin H. Mueller, Grosse Pointe Park, Mich.

Application May 20, 1940, Serial No. 336,089

10 Claims. (Cl. 158—115)

This invention relates to a lighter for gas burners such, for example, as the several burners of a gas range.

The object of the invention is to provide an improved arrangement commonly known as the pilot house for a pilot flame, and to which the ends of the flash tubes are connected. It is the aim of the invention to provide a simple structure which can be economically manufactured and supplied to the trade at a low cost, but which, nevertheless, provides a strong support and connection between the pilot house and the flash tubes. Moreover, it is the aim to provide a novel means for coupling the flash tubes to the pilot house so that the flash tubes may be easily and quickly mounted or removed, but which will be strongly held in position while coupled with the pilot housing, and wherein a limited angular adjustment is provided for each tube, both circumferentially substantially around the pilot flame as a center and in the plane of the pilot flame to take care of variations in the relative positions of the burners and pilot housing.

Arrangements for carrying out the invention are disclosed in the accompanying drawings.

Fig. 7 is a plan view similar to Fig. 2 showing another form of the invention.

Fig. 8 is a view partly in section similar to Fig. 4 showing the manner of coupling and uncoupling the form shown in Fig. 7.

Fig. 9 is a view partly in section showing the tube and housing of the Fig. 7 form in coupled relationship.

Fig. 10 is a perspective view of the housing shown in Fig. 7.

Fig. 11 is a plan view similar to Fig. 7 showing a further modified form.

Fig. 12 is a view partly in section showing the manner of coupling and uncoupling of the tube shown in the Fig. 11 form.

Fig. 13 is a view partly in section showing the coupled relationship of the tube and housing shown in the Fig. 11 form.

Fig. 14 is a perspective view of the support or housing of the Fig. 11 form.

Figure 1:
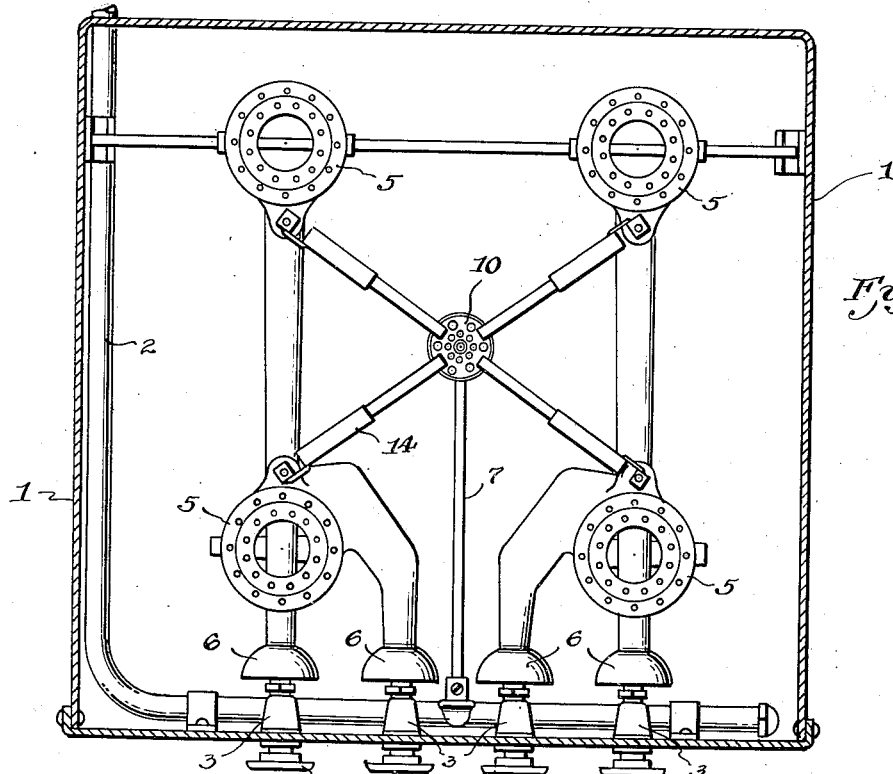
Fig. 1 is a general view, partly in section, showing gas range burners and the pilot housing and flash tube arrangement.

The frame of a stove, such as a gas range, is generally illustrated at 1, while the gas supply pipe or manifold is shown at 2. Connected to the manifold are valves 3, one for each burner, through which gas may be supplied and controlled by means of the operating handles 4. The several burners are illustrated at 5, each having an inlet or mixing tube 6 for receiving gas from the respective valves. A tube 7 is connected to the manifold for supply of gas thereto and extends to a substantially central position where its end is turned upwardly. The end of the tube may be provided with a tip 8.

The support for the flash tubes 14, and which is commonly called a pilot flame housing, is preferably in the form of a cup 10 and which may be a stamping, and which has a wall 11 extending upwardly and around the pilot flame. The cup has an opening in its bottom preferably centrally disposed and the end of the tube 7 is secured in this opening as, for example, by means of a reduced portion on the end of the tube forming a shoulder 12 and the tip 8 may be fitted over the bottom of the cup. The bottom of the cup may also be provided with apertures 15 to supply air to the flame.

Figures 2, 3:
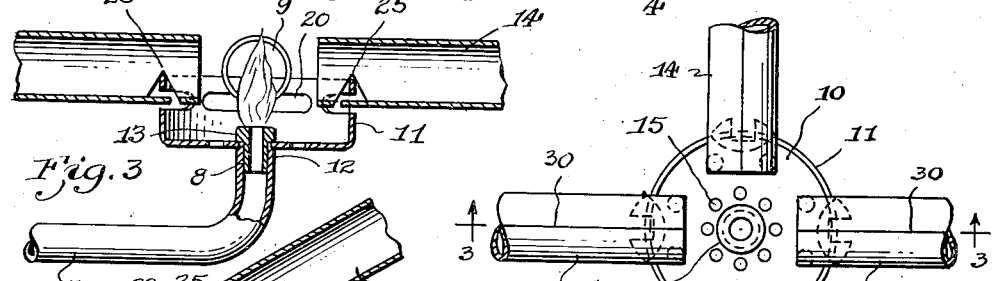
Fig. 2 is an enlarged plan view of one form of pilot housing with flash tubes attached thereto.
Fig. 3 is a cross sectional view taken substantially on line 3—3 of Fig. 2.
Figure 4:
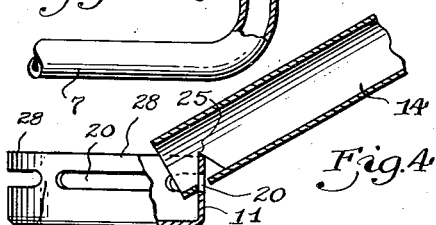
Fig. 4 is a view, partly in section, showing the housing and one flash tube, and illustrating a manner of coupling and uncoupling the tube.
Figure 5:
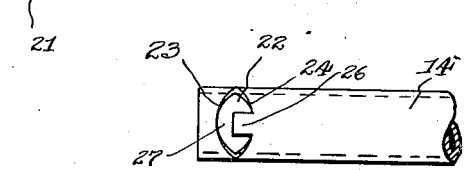
Fig. 5 is a vew of the underside of a flash tube showing the end for coupling to the pilot housing.
Figure 6:
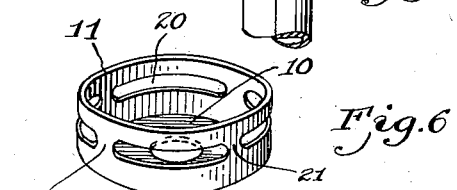
Fig. 6 is a perspective view of one form of housing or support.

The wall of the cup is formed with a number of horizontally elongated openings 20 spaced a suitable distance downwardly from the upper edge of the wall, and which openings are separated by integral metal of the cup as shown at 21. This structure forms strip-like segments 28 having parallel sides. The flash tubes are arranged to be secured to the cup through the means of these openings, and to this end the flash tubes may be formed with an opening and a tongue, as shown in Fig. 5. The underside of the tube has a transversely extending opening generally illustrated at 22, and which opening, viewed from the side as shown in Figs. 3 and 4, is of converging or substantially of a triangular shape having an inclined wall 23 and an inclined wall 24 meeting at an apex 25. Part of the metal of the tube adjacent the aperture is not cut away but is left intact to thus provide a tongue 26 which partially closes the aperture on the base side of the triangle opposite the apex. This leaves a relatively narrow slot 27 between the end of the tongue and the wall 23. These tubes may be seamless in character or may be fashioned from flat strip stock rolled up into tube form with a butt seam 30 extending along the top edges. The butt seam need not be sealed but may be formed merely by the edges of the strip stock in close abutting relationship. As a result, the opening and tongue formation 22 and 26 may be stamped in the metal while in flat form and then the metal fashioned in the tube with the seam opposite the opening and tongue.

There is preferably one opening 20 in the housing for each tube although it is feasible, if desired, to couple more than one tube at a single opening 20. A coupling is made as illustrated in Fig. 4; the tube is turned up at an angle substantially as illustrated and the segmental strip 28 of the cup passes into the opening 22 through the narrow slot 27 at which time the defining wall 23 of the opening may substantially parallel the wall of the cup as shown in Fig. 4. After the parts are positioned as shown in Fig. 4, the tube is disposed in a substantially horizontal position as shown in Fig. 3, at which time the tongue 26 projects into the slot 20 and thus underlies the segmental strip and the slot provides a way for the tongue.

The tube is thus held against vertical displacement and resultant uncoupling from the housing. Vertical movement is prevented because the tongue 26 engages the segmental strip. If the tube is urged inwardly towards the center of the cup, it may be cammed upwardly somewhat until the tongue binds against the segmental strip. If the tube is pulled outwardly, it may be cammed upwardly but here again the tongue binds against the segmental strip.

The tubes may be adjusted angularly about the pilot flame as a center for limited distances, which is adequate for accommodating different positions of the burners and the tubes may likewise assume various positions in a vertical plane to accommodate different relative heights of the pilot housing and burners, and still remain coupled to the housing. In other words, as clearly shown in Fig. 3, the end of the tube at the burner may be lowered as the coupling is somewhat loose and, as shown in Fig. 4, the end adjacent the burner may be elevated without uncoupling the tube from the housing. It is essential that the angular position of the tube relative to the housing be substantially that as shown in Fig. 4 to couple it to the housing or to uncouple it, and this angular position is materially greater than any angular position which the tube would assume in use.

In the form shown in Figs. 7 to 10, inclusive, the wall 11a of the cup 10a, instead of being provided with apertures, is formed with a plurality of spaced formations or depressions 20a which project into the cup and form concavities on the exterior. The tubes 14a are provided with an opening 22a which advantageously has an inclined wall 23a and a projection or tongue 26a. To couple the tube to the housing it is turned to an angular position as illustrated in Fig. 8 and then it is passed downwardly over the wall of the housing to bring the projection 26a into substantial alignment with the exterior concavity of the formation 20a and then the tube may be brought to a substantially horizontal position as shown in Fig. 9. The tube is restrained from uncoupling by an upward movement because the projection 26a is positioned in the concave formation.

In the form shown in Fig. 11 the cup 10b has its walls provided with formation 20b which extend outwardly and thus provide an exterior cavity. In this form the tube 14b has an opening with an inclined wall 23b and a projection 26b which, however, is reversed relative to projections 26 and 26a. To couple the tube to the housing it is turned upwardly at an angle substantially as illustrated in Fig. 12 and then passed downwardly over the cup wall and then brought to a substantially horizontal position where the projection 26b engages in the concavity of the formation. In both the forms shown in Figs. 7 to 10, inclusive, and 11 to 14, inclusive, uncoupling of the tube is accomplished by the reverse of the coupling action.

As is well known to those versed in the art, the pilot flame 9 is to burn substantially constantly. When gas is supplied to one of the burners through the means of its valve, gas issuing from its burner is directed into the flash tube and this gas flows through the flash tube to the pilot housing where it is ignited by the pilot flame. There is a resultant flash back or explosion which carries the flame back through the tube to the burner to ignite the gas issuing from the ports thereof.

I claim:

1. In a lighter for gas burners, a supporting member comprising a wall extending around a pilot flame, said wall having a plurality of separate circumferentially elongated ways therein spaced from the top of the wall and substantially paralleling the top of the wall, thereby providing strip-like portions thereabove, a flash tube for extending from the supporting member to each burner and coupling means on each flash tube in the form of a notch and a tongue partially closing the notch, said notch adapted to pass over and receive one of said strip-like portions when the tube is angularly positioned relative to a perpendicular to the wall and the tongue adapted to be engaged under the strip-like portion in said way when the tube is moved to a position substantially at right angles to the portion of the strip in the notch.

2. In a lighter for gas burners, a supporting member comprising, a substantially vertical circular wall extending around a pilot flame substantially concentrically therewith, said wall having a plurality of separate circumferentially elongated ways spaced from the top thereof and substantially paralleling the top, a flash tube for extending from the supporting member to each burner and coupling means on each flash tube in the form of a notch in its lower portion and a tongue partially closing the opening of the notch, said notch adapted to be passed over the top of the upper edge of said wall when the tube is positioned so as to extend angularly relative to a perpendicular to the wall and said tongue adapted to engage in a way when the tube is swung to a substantially horizontal position.

3. In a lighter for gas burners, a supporting member comprising a wall extending around a pilot flame, said wall having a plurality of separate circumferentially elongated apertures therein spaced from the top of the wall and substantially paralleling the top of the wall thereby forming separate strip like members above each opening, a flash tube for extending from the supporting member to each burner, and coupling means on each flash tube in the form of a notch and a tongue partially closing the notch, said notch adapted to pass over and receive one of said strip like members when the tube is angularly position relative to a perpendicular to the wall and the tongue adapted to engage in an elongated aperture and under the strip like member when the tube is moved to a position substantially at right angles to the portion of the strip in the notch.

4. In a lighter for gas burners, a supporting member comprising a substantially vertical circular wall extending around a pilot flame substantially concentrically therewith, the said wall having a plurality of separate circumferentially elongated apertures spaced from the top thereof and substantially paralleling the top thereby forming strip like members above each opening, a flash tube for extending from the supporting member to each burner and coupling means on each flash tube in the form of a notch and a tongue partially closing the opening of the notch, said notch adapted to pass over and receive one of said strip like members through the restricted opening when the tube is positioned so that it is angularly inclined relative to the vertical wall, and said tongue adapted to engage in the notch and under the strip like member when the tube is swung to a substantially horizontal position.

5. In a lighter for gas burners, a supporting member in the form of a wall extending around a pilot flame, said wall having a plurality of separate elongated apertures substantially paralleling the top of the wall, a flash tube for extending from the support to a gas burner, said flash tube having a notch formed therein in one side which becomes the bottom of the tube, said notch converging upwardly from the lowermost part of the tube and being elongated circumferentially so as to extend on opposite sides of a vertical plane through the tube axis, and a tongue on the lower portion of the tube extending axially and partially closing the notch to define a restricted entrance into the notch, said tube being adapted to be disposed at an inclined angle relative to the wall for the reception of the upper edge of the supporting member through the restricted entrance, and the tongue being adapted to engage in one of the elongated apertures in the support as the tube is swung to a substantially horizontal position.

6. In a lighter for gas burners, a supporting member in the form of a wall extending around a pilot flame, said wall having a plurality of separate elongated apertures substantially paralleling the top of the wall, a flash tube for extending from the support to a gas burner, said flash tube having a notch formed therein in one side which becomes the bottom of the tube, said notch converging upwardly from the lowermost part of the tube and being elongated circumferentially so as to extend on oppostite sides of a vertical plane through the tube axis, and a tongue on the lower portion of the tube extending axially and partially closing the notch to define a restricted entrance into the notch, said tube being adapted to be disposed at an upwardly inclined angle for the reception of the upper edge of the supporting member through the restricted entrance, and the tongue being adapted to engage in one of the elongated apertures in the support as the tube is swung to a substantially horizontal position, the elongated aperture in the support having a dimension greater than the cross dimension of the tongue for angular shift of the flash tube about the pilot flame.

7. In a lighter for gas burners, means for supporting a pilot flame, a supporting member in the form of a cup having a substantially vertical wall extending substantially concentrically about the pilot flame, said wall having a plurality of separate elongated apertures therein substantially paralleling the top of the wall, a flash tube for extending from the cup to a burner and having an opening therein of elliptical form with the long axis of the opening extending circumferentially of the tube, and a tongue extending partially across the opening in the direction of its short axis to form a restricted entrance, the restricted entrance being adapted to receive the upper edge of the wall when the tube is disposed angularly relative to a perpendicular to the wall and the tongue being adapted to engage in an elongated aperture in the support when the tube is swung to a substantially horizontal position.

8. In a lighter for gas burners, means for supporting a pilot flame, a supporting member in the form of a cup having a substantially vertical wall extending substantially concentrically about the pilot flame, said wall having a plurality of separate elongated apertures therein forming substantially parallel sided strip like segments on the side thereabove, a flash tube for extending from the cup to a burner and having an opening therein of elliptical form with the long axis of the opening extending circumferentially of the tube, and a tongue extending partially across the opening in the direction of its short axis to form a restricted entrance, the restricted entrance being adapted to receive the upper edge of the wall when the tube is disposed angularly relative to a perpendicular to the wall and the tongue being adapted to engage in an elongated aperture in the support when the tube is swung to a substantially horizontal position, said tube being shiftable along the segmental strip substantially about the pilot flame as a center while thus coupled to the support.

9. In a lighter for gas burners, a supporting member comprising a substantially vertical wall extending around a pilot flame substantially concentrically, said wall having a plurality of separate circumferentially elongated depressions therein substantially paralleling the top of the wall and providing a convexity on one side of the wall and a concavity on the other, a flash tube for extending from the supporting member to each burner, and coupling means on each flash means in the form of a notch and a tongue partially closing the opening of the notch, said notch adapted to receive said wall through the restricted opening when the tube is positioned angularly relative to a perpendicular to the wall, and said tongue adapted to engage in the concavity of a depression when the tube is swung to a substantially horizontal position.

10. In a lighter for gas burners, a supporting member comprising an upstanding wall extending around a pilot flame, said wall having way means therein spaced from the top edge of the wall and substantially paralleling the top edge of the wall, a flash tube for extending from the supporting member to each burner, and coupling means on each flash tube in the form of a notch and a tongue partially closing the notch, said notch adapted to pass over and receive the upper edge of said wall when the tube is angularly positioned relative to a perpendicular to the upstanding wall, and said tongue adapted to engage in the way means when the tube is moved to a position substantially at right angles to the portion of the wall in said notch.

ERVIN H. MUELLER.